United States Patent [19]

Nagano

[11] 4,289,490

[45] Sep. 15, 1981

[54] IMPROVED REAR HUB CHAIR PROTECTOR

[75] Inventor: Masashi Nagano, Sakai, Japan

[73] Assignee: Shimano Industrial Company Limited, Osaka, Japan

[21] Appl. No.: 99,483

[22] Filed: Dec. 3, 1979

[30] Foreign Application Priority Data

Dec. 9, 1978 [JP] Japan .............................. 53-170078[U]

[51] Int. Cl.³ .............................................. F16H 7/18
[52] U.S. Cl. ..................................... 474/144; 474/151; 74/609
[58] Field of Search .................. 74/609; 474/144, 145, 474/146, 147, 69, 78, 140, 151, 165

[56] References Cited

U.S. PATENT DOCUMENTS

| 675,502 | 6/1901 | Thomas | 74/609 |
| 3,964,330 | 6/1976 | Ozaki | 474/140 |
| 4,102,215 | 7/1978 | Nagano et al. | 474/165 |
| 4,114,473 | 9/1978 | Pollak | 474/144 |

Primary Examiner—Kenneth Dorner
Attorney, Agent, or Firm—Stevens, Davis, Miller & Mosher

[57] ABSTRACT

A rear hub for a bicycle, which has a hub shell supported rotatably to a hub shaft through a pair of bearings and which carries two or more sprockets at one axial end of the hub shell which are freely rotatable in one direction, is provided with a protector disposed axially outwardly the smallest diameter high speed sprocket. The protector has a diameter larger than the high speed sprocket, and is supported to a rear hub fixing member fixed to the hub shaft.

6 Claims, 3 Drawing Figures

IMPROVED REAR HUB CHAIR PROTECTOR

BACKGROUND AND SUMMARY OF THE INVENTION

This invention relates to a rear hub for a bicycle, and more particularly to a rear hub for a bicycle, which has two or more sprockets of different diameters among which a driving chain is switched for changing the bicycle speed.

Generally, a rear hub for a bicycle comprises a hub shaft, a hub shell supported rotatably to the hub shaft through a pair of bearings, and a driving member having two or more sprockets of different diameters which are supported at one axial end of the hub shell to be freely rotatable in one direction through a unidirectional rotary transmission. A back fork of the bicycle is sandwiched at each leg between a lock nut screwed with the hub shaft to fix the bearing and a tightening nut screwed with the axially outermost end of hub shaft, so that the tightening nut is tightened to fix the hub shaft to the back fork.

A high speed sprocket having the least number of teeth of all the sprockets, faces a leg of the back fork providing an interval between it and the leg nearly equal to or larger than width of the driving chain. Accordingly, the driving chain, when switched from a low speed sprocket having a larger number of teeth to the high speed sprocket may disengage from the high speed sprocket and enter and jam in this interval.

A protector has been provided axially outwardly of the high speed sprocket in order to prevent disengagement of the chain therefrom, the protector being fixed to the driving member and rotatable together therewith.

In this construction, the protector contacts with the back fork due to its mounting condition. Therefore, the driving member is conventionally axially shifted toward the center of the axial length of the hub shaft, so that the outermost sprocket at the driving member may be spaced from the back fork by a given interval.

When the driving member is shifted in this manner, the hub flange carrying spokes of a wheel which is positioned at one axial end of the hub shell, at the driving member side, is also shifted toward the center of axial length of the hub shaft. As a result, the center of axial length of the wheel and that of axial length between the one hub flange and the other opposite thereto, are considerably axially offset thus increasing the so-called offset amount, thereby reducing the strength of the wheel. Also, the rotatable protector may catch a foreign object within a space existing between the protector and the back fork.

The above problem is solved by fixing the protector to the back fork, using any suitable fixing means. However, another problem then occurs in that a protector of proper size cannot be readily selected correspondingly to different sized sprockets when a bicycle is assembled. In other words, the protector should be fixed to the back fork prior to assembly of the bicycle, so that if and when the sprocket size is changed, the already fixed protector can easily be replaced by a new one corresponding to the changed sprocket.

This invention has been designed in order to overcome the above problems. An object of the invention is to provide a rear hub for a bicycle, which can simply mount the protector with respect to the high speed sprocket without an increase of the offset amount and which permits easily selection of the proper protector size corresponding to the diameter of the high speed sprocket.

The present invention is directed to supporting the protector by use of the fixing member fixed to the hub shaft, such as a lock nut or the like. The invention was devised after careful observation of the fact that, in a bicycle rear hub, bearings for rotatably supporting the hub shell are fixed to the hub shaft through fixing members, such as tightening nuts and lock nuts, the fixing members contacting with the back fork to thereby fix the hub shaft thereto, and that the fixing member, such as the lock nut, is positioned axially outwardly from one end of the driving member.

This invention is characterized in that the rear bicycle hub, which supports the hub shell rotatably to the hub shaft through a pair of bearings and carries at one axial end of the hub shell two or more sprockets supported to be freely rotatably in one direction, is provided with a protector arranged axially outwardly of the smallest diameter high speed sprocket the protector being larger in diameter than the high speed sprocket. The protector is supported to a fixing member fixed to the hub shaft.

The fixing member mainly comprises a lock nut screwed with the hub shaft for fixing the bearing to the hub shaft. The protector is fit onto the lock nut through a bore which is formed at the center of the protector and has a size and shape corresponding to the external size and shape of the lock nut. The protector is prevented from axial movement by being tightly is fit onto the lock nut, or the protector is formed of a material, e.g., a synthetic resin, which is elastically deformable and not harder than the lock nut and is elastically press-fit thereto. Alternatively, the protector is formed with a thick center and is sandwiched between the back fork and a sealing member supported to the lock nut, the bearing or a tightening nut therefor.

Accordingly, the hub of the invention utilizes the fixing member for easily mounting the protector, thereby avoiding an increase in the offset amount and renders a particular fixing means unnecessary. In addition, a protector of proper size corresponding to the diameter of the high speed sprocket can be readily selected.

These and other objects and novel features of the invention will be more apparent from the following description which is provided in conjunction with the accompanying drawings.

DETAILED DESCRIPTION OF THE INVENTION

Figure 1:
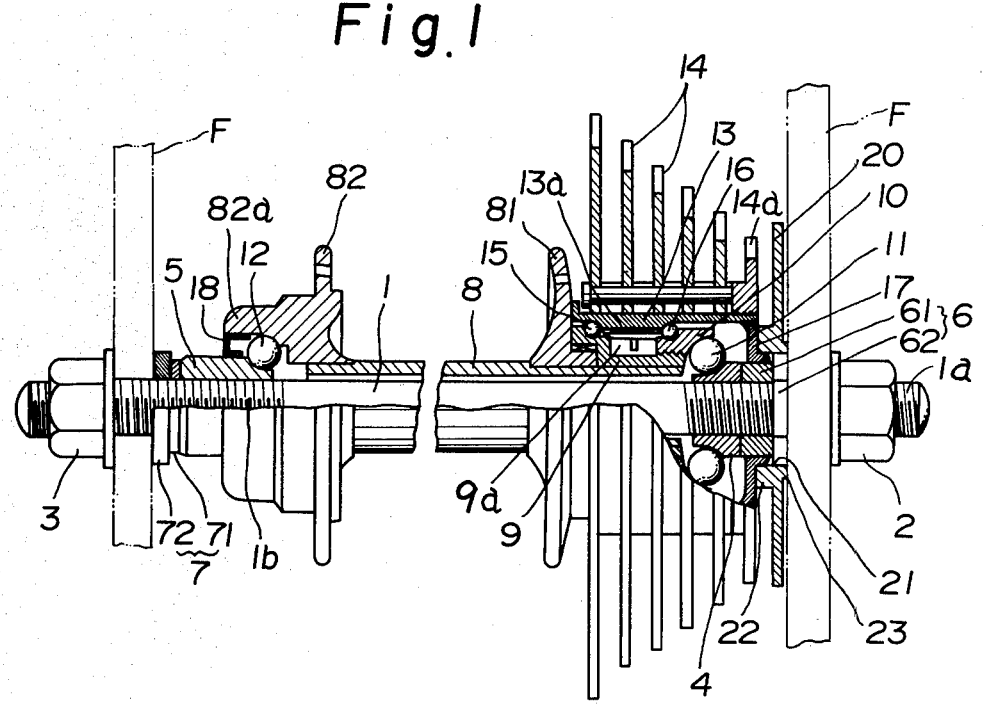
FIG. 1 is a partially omitted and cutaway front view of an embodiment of the rear hub of the invention.

Referring to the drawings, reference numeral 1 designates a hub shaft. The hub shaft 1 has at the outer periphery of both axial ends screw threads 1a and 1b, and is fixed to a back fork F through a pair of fixing nuts 2 and 3 screwed with the screw threads 1a and 1b respectively.

Reference numerals 4,5 designate a pair of bearings screwed with the screw threads 1a and 1b. The bearings 4 and 5 have at the outer peripheries thereof ball races respectively and are fixed in position at the hub shaft 1 by means of first and second fixing members 6 and 7 screwed therewith axially outwardly from the bearings 4 and 5 respectively.

As seen from the drawings, the first fixing member 6 comprises a tightening nut 61 pushing the bearing 4 axially inwardly of the hub shaft 1 and a lock nut 62 for fixing the nut 61. The second fixing member 7 comprises a washer 71 and a lock nut 72. Alternatively, the tightening nut 61 of the first fixing member 6 may be replaced by a washer, or a washer may be inserted between the bearing 4 and the tightening nut 61. The washer 71 of the second fixing member 7 may be replaced by a tightening nut.

Reference numeral 8 designates a hub shell which is supported rotatably to the hub shaft 1 through the pair of bearings 4 and 5 fixed thereto. The hub shell 8 has at both lengthwise ends thereof a pair of first and second hub flanges 81 and 82. An inner member 9 is fixed to the hub shaft 1 axially outwardly from the first hub flange 81. Balls 11 are inserted between a ball race formed at a ring-like shaped cone 10 screwable with the inner member 9 and a ball race at the bearing 4, thereby supporting the hub shell 8 at one axial end thereof.

An extension 82a is provided axially outwardly from the second hub flange 82, and balls 12 are inserted between the bearing 5 and a ball race formed at the inner periphery of the extension 82a, so that the hub shell 8 is supported at its the other axial end to the hub shaft 1 through the balls 12.

The inner member 9 is of a cylindrical stepped shape, and is fixed to the first hub flange 81 at the axially outward portion thereof. It has a ball race at the outer periphery of an axially inward end portion, a screw thread at the outer periphery of an axially outward end portion screwable with the cone 10, and pawls 9a at the outer periphery between the ball race and the screw thread, the pawls 9a constituting a unidirectional rotary transmission.

Reference numeral 13 designates a cylindrical driving member having at the outer periphery thereof a plurality of sprockets 14 (six sprockets are shown) of different diameters. The driving member 13 is provided at its inner periphery with ratchet teeth 13a which mesh with the pawls 9a and constitute together therewith the unidirectional rotary transmission, and with ball races provided at both lengthwise sides of the ratchet teeth 13a. Pairs of balls 15 and 16 are inserted between the ball races at the driving member 13 and those at the inner member 9 and at the outer periphery of cone 10, thereby supporting the driving member 13 to the inner member 9 such that the inner member 9 is rotatable by movement of driving member 13 in one direction only.

Reference numeral 17 designates a disk like sealing member. The sealing member 17 is fit close to the outer periphery of tightening nut 61, and contacts at its outer periphery with the inner periphery of driving member 13 to thereby close a gap between the bearing 4 and the driving member 13 preventing dust or rain water from entering the bearing 4. A sealing member 18 is fit close to the outer periphery of bearing 5 to thereby close a gap between the bearing 5 and the extension 82a.

Thus far, a well-known rear hub bicycle assembly has been described. This invention provides a protector 20 at the rear hub to prevent a driving chain (not shown) from disengaging from a first sprocket 14a (in the drawing, the smallest diameter high speed sprocket) at the axially outermost side of the sprockets 14.

Figure 2:
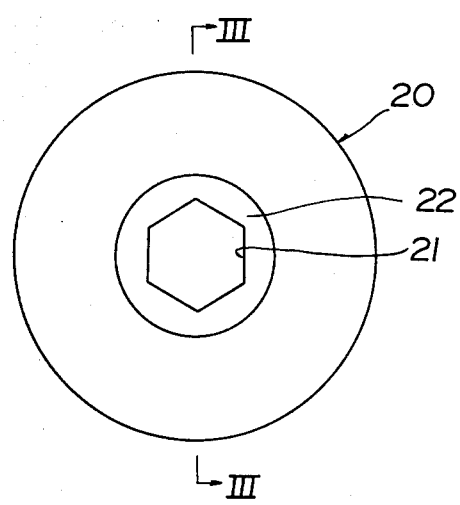
FIG. 2 is a front view of a protector only.

In detail, the protector 20, as shown in FIG. 2, is formed in a disc-like shape and has a larger diameter than an addendum circle of the first sprocket 14a. Protector 20 also has at its center a bore 21 which fits onto the outer periphery of the first fixing member 6 the latter supporting protector 20, and is arranged axially outwardly of the first sprocket 14a, thereby preventing the chain from disengaging from the sprocket 14a.

The protector 20 shown in FIGS. 1 and 2, is formed of synthetic resin and has a hexagonal central bore 21 coincident with the external form of lock nut 62, and is tightly press-fit thereto through the bore 21.

Figure 3:
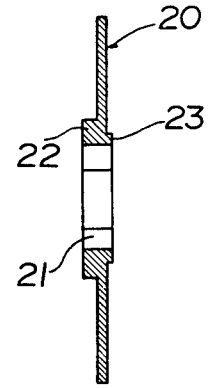
FIG. 3 is a sectional view taken on the line III—III in FIG. 2.

The press fitting of protector 20 to the first fixing member 6 is enough to restrained its axial movement. However, the protector 20, as shown in FIG. 3, is provided around the bore 21 with first and second projections 22 and 23 projecting from opposite axial sides of the protector. The first projection 22 contacts with the sealing member 17 and the second projection 23 into contact with the inner surface of the leg of back fork F, thereby further ensuring that the protector 20 is retained against axial movement. The second projection 23 when in contact with the back fork F forms a gap having a width corresponding to the thickness of the projection between the protector 20 and the inner surface of back fork F. This gap, in cooperation with the protector 20 when formed of elastically deformable synthetic resin, can buffer an impact applied to the chain when it strikes protector 20.

The protector 20 is fit to the first fixing member 6 prior to assembly of the rear hub to the back fork F, and the second projection 23 contacts with the inner surface of back fork F as the hub shaft 1 is fixed thereto, whereby the protector 20 is kept in position through the projection 23.

If a chain, is switched by a derailleur (not shown) from another sprocket 14 to the first sprocket 14a at the outermost side and, is biased axially outwardly of the sprocket 14a so as to tend to disengage therefrom, the protector 20 restrains the chain from moving beyond a given range, so the chain is prevented from disengaging from the sprocket 14a.

Also, the protector 20 has the first and second projections 22 and 23, and the latter projection contacts with the back fork F to be restrained against axial movement, thereby always reliably preventing the chain from disengaging from the sprocket 14a.

The protector 20, which is press-fit onto the lock nut 62 screwably fixed to the hub shaft 1, does not rotate with the rotating driving member 13. Hence, the protector 20 may closely contact with the back fork F, and any gap between them, even when provided, is very narrow, thereby reducing the danger of catching a foreign object therein.

Alternatively, the protector 20 may be press-fit onto the tightening nut 61 or bearing 4. In addition, the protector 20 need not be in a circular shape but may be in the form of ellipse or in any other non-circular form. Furthermore, the protector 20 may be engaged with grooves of the back fork F, to further inhibit its rotation.

As clearly understood from the above description, the invention, which provides a protector supported to the first fixing member fixed to the hub shaft, need not shift the hub flange and sprocket group toward the center of axial length of the hub shaft because of the contact of the protector with the back fork as in a conventional hub. The invention also ensures the mounting of the protector within a restricted space between the outermost sprocket and the back fork. Consequently, the mounting of the protector does not increase the so-called offset amount and deterioration of the wheel strength cause by such offset does not occur.

Furthermore, the protector has the advantage of being easily mountable by use of the first fixing member, such as the lock nut, fixed to the hub shaft.

While an embodiment of the invention has been shown and described, the invention is not limited to the specific construction thereof, which is merely exemplary. Rather, the invention is limited solely by the attached claims.

What is claimed is:

1. In a rear hub for a bicycle, said hub comprising a hub shaft, a pair of bearings mounted to said hub shaft, a hub shell supported rotatably to said hub shaft through said bearings, a cylindrical driving member disposed at one axial end portion of said hub shell supporting a plurality of sprockets of different diameters, a unidirectional rotary transmission mechanism for transmitting driving force from said driving member to said hub shell, and a first and a second fixing member for fixing said bearings to said hub shaft, the improvement comprising a protector having an outer periphery larger in diameter than a first sprocket of said plurality of sprockets, said first sprocket being positioned at the axial outermost side of said hub shaft, said protector having at its center a fitting bore which fits onto said first fixing member, being arranged axially outwardly of said first sprocket and between it and a fork of a bicycle, and being supported to said first fixing member, said protector preventing a driving chain from disengaging from said first sprocket.

2. A rear hub for a bicycle according to claim 1, wherein said first fixing member comprises a tightening nut and a lock nut for locking said tightening nut, said lock nut carrying at the outer periphery thereof said protector.

3. A rear hub for a bicycle according to claim 1, further comprising a sealing member inserted between the first fixing member and the inner periphery of said driving member, so that said protector is supported to said first fixing member at a portion thereof outside said sealing member.

4. A rear hub for a bicycle according to claim 3, wherein said protector comprises a disc and is provided around the fitting bore at the center of said protector with a first and a second projection respectively projecting from opposite axial sides of said protector, said first projection contacting with a bicycle fork for fixing said hub shaft, said protector being supported to said first fixing member so as not to be axially movable.

5. A rear hub for a bicycle according to claim 4, wherein said protector is formed of synthetic resin and said fitting bore provided at the center of said protector is tightly press-fit to the outer periphery of said first fixing member.

6. A rear hub for a bicycle according to claim 1, wherein said protector is supported to said first fixing member in a manner preventing axial movement of said protector.

* * * * *